(12) United States Patent
Motojima

(10) Patent No.: US 7,708,575 B2
(45) Date of Patent: May 4, 2010

(54) CARD CONNECTOR CAPABLE OF SWITCHING A CARD HOLDING STATE WITH A SIMPLE STRUCTURE

(75) Inventor: Joe Motojima, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 12/313,843

(22) Filed: Nov. 25, 2008

(65) Prior Publication Data

US 2009/0142963 A1    Jun. 4, 2009

(30) Foreign Application Priority Data

Nov. 30, 2007    (JP) .............................. 2007-311621

(51) Int. Cl.
*H01R 13/62*    (2006.01)
(52) U.S. Cl. ........................................ 439/159; 439/630
(58) Field of Classification Search .................. 439/159, 439/155, 630, 160
See application file for complete search history.

(56) References Cited

U.S. PATENT DOCUMENTS

| | | | |
|---|---|---|---|
| 6,773,280 B2 | 8/2004 | Sasaki et al. | |
| 6,929,490 B2 * | 8/2005 | Kodera et al. | 439/159 |
| 7,118,394 B2 * | 10/2006 | Yoneyama et al. | 439/159 |
| 7,314,390 B1 * | 1/2008 | Lai et al. | 439/630 |
| 7,326,071 B1 * | 2/2008 | Ho et al. | 439/159 |
| 7,361,035 B1 * | 4/2008 | Lai | 439/155 |
| 2007/0281525 A1 * | 12/2007 | Yu et al. | 439/159 |

FOREIGN PATENT DOCUMENTS

| | | |
|---|---|---|
| JP | 2000-260524 | 9/2000 |
| JP | 2001-326028 | 11/2001 |
| JP | 2003-077589 | 3/2003 |
| JP | 2003-217738 | 7/2003 |
| JP | 2004-207164 | 7/2004 |
| WO | WO 01/89041 | 11/2001 |

* cited by examiner

*Primary Examiner*—Hien Vu
(74) *Attorney, Agent, or Firm*—Collard & Roe, P.C.

(57) ABSTRACT

In a card connector for connection to a card, a connector frame defines a region allowing the card to be fitted therein and holds a contact adapted for contact with the card. For ejecting the card, an eject member is movable with respect to the connector frame and swingably holds a locking member having a locking function to lock the card. The locking member swings due to engagement with the connector frame according to movement of the eject member, thereby controlling the locking function.

8 Claims, 8 Drawing Sheets

US 7,708,575 B2

CARD CONNECTOR CAPABLE OF SWITCHING A CARD HOLDING STATE WITH A SIMPLE STRUCTURE

This application is based upon and claims the benefit of priority from Japanese patent application No. 2007-311621, filed on Nov. 30, 2007, the disclosure of which is incorporated herein in its entirety by reference.

TECHNICAL FIELD

This invention relates to a connector for use in connecting a card. Herein, this connector is called a "card connector".

BACKGROUND ART

This type of card connector normally has an eject mechanism for ejecting a card. There is known an eject mechanism called a push-push type or a W-PUSH type. This type of eject mechanism has an eject member adapted to move in a connector along with an inserted card.

For example, Japanese Unexamined Patent Application Publication (JP-A) No. 2003-217738 discloses a card connector in which an eject member having a pushing portion, an engaging portion, and a spring portion is switchable between first and second positions. In this card connector, in the state where a card is connected to the connector, the eject member is in the second position where the engaging portion is in engagement with a cutout of the card and this engagement is prevented from being released. Therefore, even if a strong pulling force is applied to the card, the card does not come off the connector. On the other hand, when the eject member is moved from the second position to the first position, the card is pushed out by the pushing portion. Although the engaging portion is still in engagement with the cutout of the card even in the first position, since this engagement can be released by elastic deformation of the spring portion, the card can be easily pulled out by applying a pulling force to the card to cause such elastic deformation.

Japanese Unexamined Patent Application Publication (JP-A) No. 2003-77589 discloses a connector for connecting an IC card. This connector includes a plate spring having one end fixed to an eject member and the other end serving as a locking portion curved into a generally U-shape. The locking portion can enter and retreat from a cutout of the IC card. A guide portion is provided in a connector housing of the connector. In this card connector, when the IC card is fitted into the connector, the effective size of the plate spring decreases following the movement of the eject member so that the locking portion enters the cutout of the IC card due to elastic deformation of the plate spring. Therefore, even if a strong pulling force is applied to the IC card, the IC card does not come off the connector. On the other hand, when the eject member moves in a direction of pushing out the IC card, the effective size of the plate spring increases so that the locking portion retreats from the cutout of the IC card due to restoration of the plate spring and thus the IC card can be easily pulled out.

SUMMARY OF THE INVENTION

However, either of the above connectors is complicated in structure and thus has much difficulty in responding to recent demands for miniaturization.

It is therefore an exemplary object of this invention to provide a card connector that realizes, with a simple structure, a function of securely holding a card in a fitted state and softly holding the card in an ejected state and thus that easily enables miniaturization thereof.

Other objects of the present invention will become clear as the description proceeds.

According to an exemplary aspect of the present invention, there is provided a card connector for connection to a card. The card connector comprises a connector frame which defines a region allowing the card to be fitted therein, a contact which is held by the connector frame and adapted for contact with the card, an eject member which is movable with respect to the connector frame for ejecting the card, and a locking member which is swingably held by the eject member and having a locking function to lock the card, wherein the locking member swings due to engagement with the connector frame according to movement of the eject member, thereby controlling the locking function.

DESCRIPTION OF THE EXEMPLARY EMBODIMENT

Figure 1:
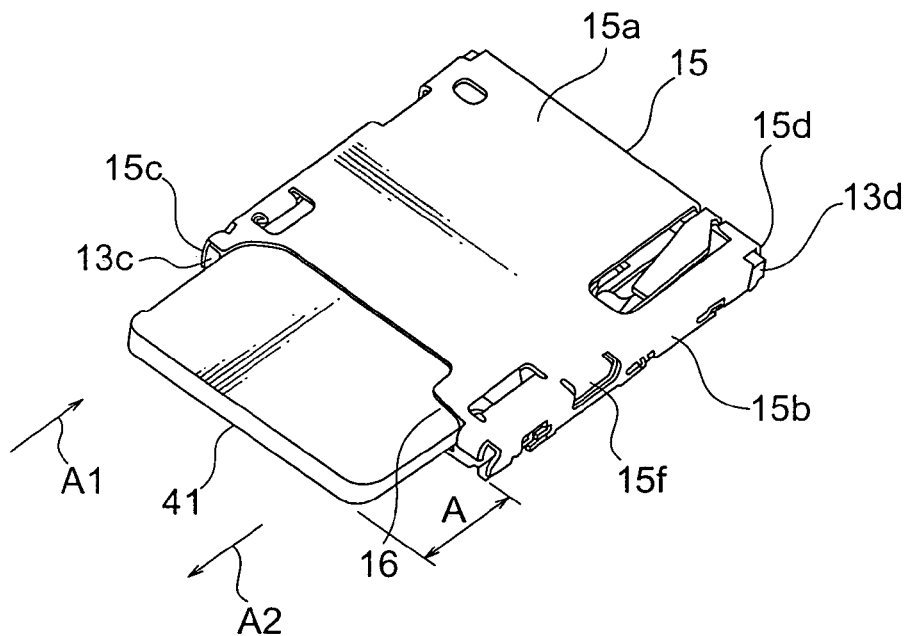
FIG. 1 is a perspective view illustrating a card connector according to an exemplary embodiment of this invention, along with a card in an ejected state.
Figure 2:
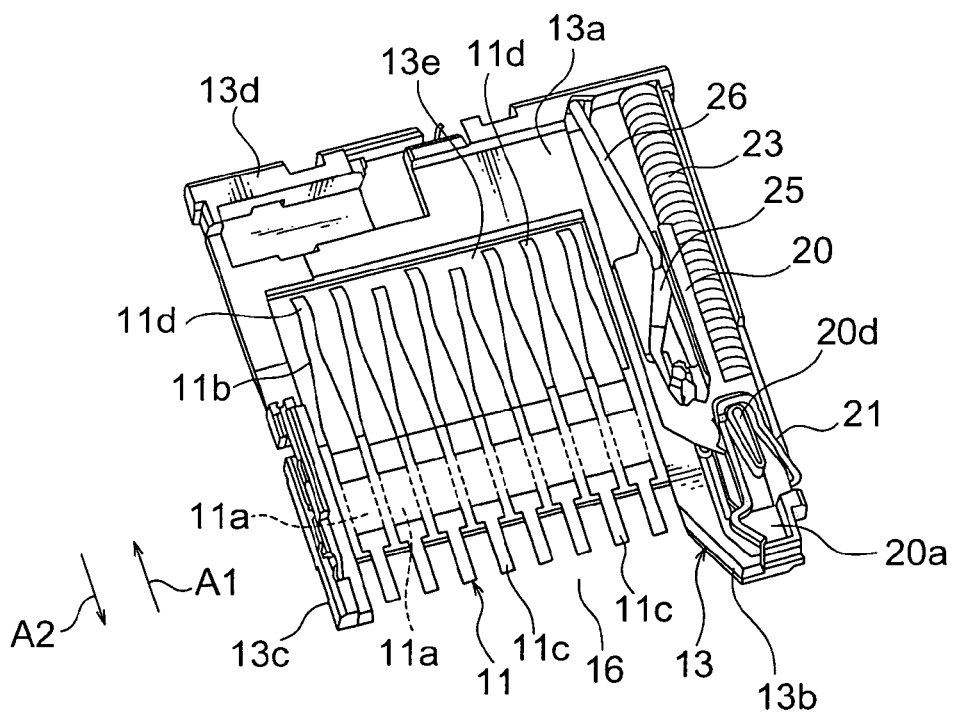
FIG. 2 is a perspective view illustrating a state where a cover and the card are removed from the card connector illustrated in FIG. 1.

Referring to FIGS. 1 and 2, a card connector according to an exemplary embodiment of this invention will be described in its entirety. FIG. 1 illustrates the external appearance of the card connector in an ejected state where a card is ejected by an eject mechanism to a position where the card can be pulled out of the connector. FIG. 2 illustrates a state where a cover and the card are removed from the connector illustrated in FIG. 1.

In FIGS. 1 and 2, the card connector comprises a plurality of contacts 11, a housing 13 holding the contacts 11, a cover 15 coupled to the housing 13 and covering the contacts 11, and an eject mechanism held by the housing 13 so as to be movable in a fitting direction A1 of a card 41 and in an ejection direction A2 thereof opposite to the fitting direction A1. Herein, the housing 13 and the cover 15 are collectively called a connector frame defining a region where the card is inserted.

As illustrated in FIG. 2, each contact 11 comprises a holding portion 11a, a contact spring portion 11b extending in the fitting direction A1 from one end of the holding portion 11a, and a terminal portion 11c extending in the ejection direction A2 from the other end of the holding portion 11a.

The contacts 11 are formed by punching a conductive plate. The holding portions 11a of the contacts 11 are held by the housing 13. A contact portion 11d of a curved shape is formed at a front end, in the fitting direction A1, of each contact spring portion 11b.

When the card 41 and the connector are in a fitted state, the contact portions 11d of the contacts 11 are brought into contact with connection conductors (not illustrated) of the card 41. The terminal portions 11c are connected to circuits of a board such as a printed circuit board by soldering when the connector is mounted on the board.

The housing 13 comprises a base portion 13a of a generally flat plate shape, a pair of side frame portions 13b and 13c formed along a pair of sides, each extending in the fitting or ejection direction A1 or A2, of the base portion 13a, and a rear frame portion 13d formed on a rear side in the ejection direction A2.

The side frame portions 13b and 13c and the rear frame portion 13d each have a thickness dimension greater than that of the base portion 13a and each have an upper surface higher than that of the base portion 13a. The housing 13 can be formed by molding an insulating resin material.

The base portion 13a is formed with a large window 13e at its central portion. The contact spring portions 11b of the contacts 11 are disposed in the window 13e. The contact portions 11d of the contact spring portions 11b are electrically connected to the connection conductors of the card 41 inserted into the card receiving region, defined by the connector frame, in the foregoing fitted state.

The cover 15 covers the housing 13. Specifically, the cover 15 comprises a main plate portion 15a of a flat plate shape, a pair of side plate portions 15b and 15c formed along a pair of sides, each extending in the fitting or ejection direction A1 or A2, of the main plate portion 15a, and a rear plate portion 15d formed on the rear side in the ejection direction A2.

The main plate portion 15a of the cover 15 faces the upper surfaces of the base portion 13a and the side frame portions 13b and 13c of the housing 13. The side plate portions 15b and 15c respectively face outer side surfaces of the side frame portions 13b and 13c and hold the side frame portions 13b and 13c so as to embrace them. The rear plate portion 15d of the cover 15 holds the rear frame portion 13d of the housing 13 so as to embrace it.

A space surrounded by the base portion 13a and the side frame portions 13b and 13c of the housing 13 and the cover 15 serves as the foregoing card receiving region. The space has a front end, in the ejection direction A2, serving as an opening 16 for enabling insertion of the card 41 in the fitting direction A1 or pulling-out of the card 41 ejected in the ejection direction A2.

In the state where the card 41 is ejected, the card 41 is still in engagement with the eject mechanism, which will be described hereinbelow, for preventing the card 41 from coming off the connector. In this state, the card 41 protrudes from the opening 16 in the ejection direction A2 by a dimension A as illustrated in FIG. 1.

Figure 3:
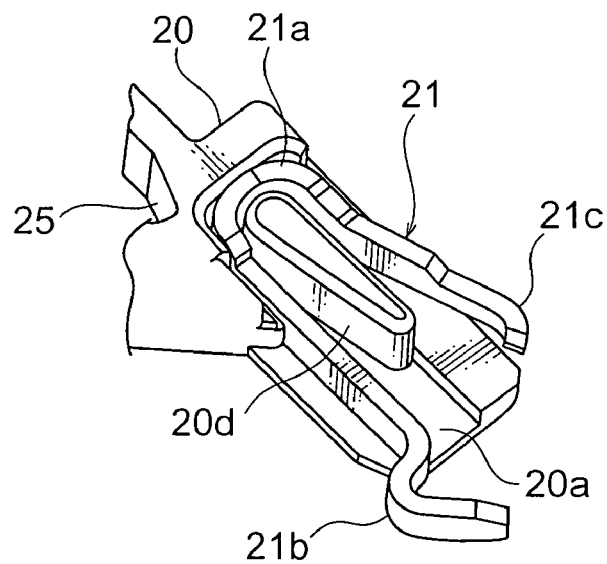
FIG. 3 is an enlarged perspective view illustrating only a main portion of FIG. 2.
Figure 4:
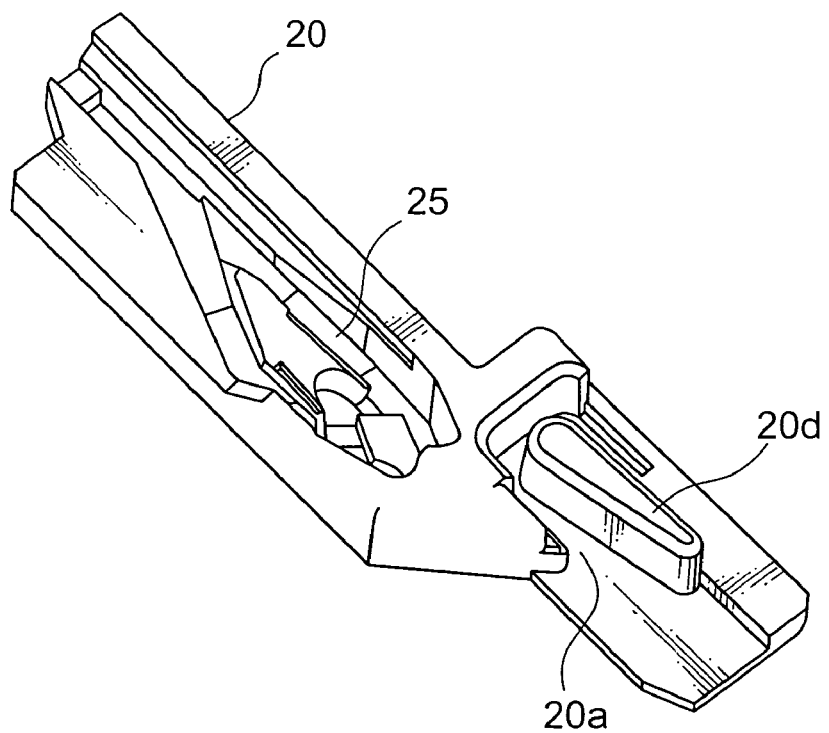
FIG. 4 is an enlarged perspective view illustrating only part of a state where some of components are removed from the state of FIG. 2.

Referring to FIGS. 3 and 4, the eject mechanism will be described.

The eject mechanism is provided at the side frame portion 13b of the housing 13. The eject mechanism comprises an eject member or an eject bar 20 held by the side frame portion 13b and a locking member 21 swingably held in a large groove-like receiving portion 20a formed on the eject bar 20.

The eject bar 20 is reciprocatingly slidable in the fitting and ejection directions A1 and A2.

The eject bar 20 is formed by molding a resin material. The eject bar 20 is constantly urged in the ejection direction A2 by a spring 23. Further, the eject bar 20 is formed with a cam portion 25 on its front side in the fitting direction A1. The cam portion 25 is in the form of a groove having a generally heart shape.

As illustrated in FIG. 2, one end portion of a rod-shaped cam follower 26 is in engagement with the cam portion 25. The other end portion of the cam follower 26 is fixed to the rear frame portion 13d of the housing 13. The locking member 21, the spring 23, and the cam follower 26 are each preferably made of a metal material.

Figure 5:
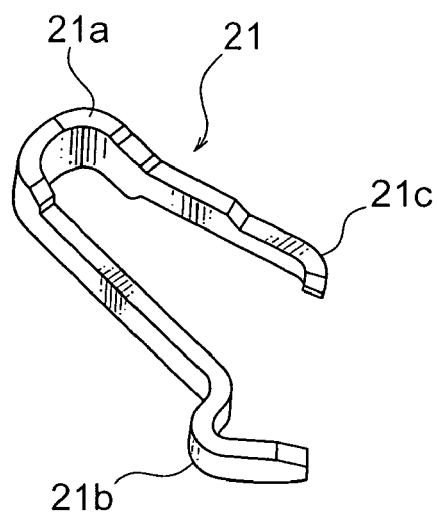
FIG. 5 is a perspective view of a locking member included in the main portion illustrated in FIG. 3.

Referring to FIG. 5 in addition to FIG. 3, the locking member 21 will be described.

As illustrated in FIGS. 3 and 5, the locking member 21 has a generally U-shape (or a generally clip shape) in plan. The locking member 21 comprises a U-shaped portion 21a as a holding portion swingably held in the eject mechanism, a locking portion 21b provided at one end of the U-shaped portion 21a, and a spring portion 21c provided at the other end of the U-shaped portion 21a.

The locking member 21 is swingably held with respect to the eject bar 20 by means of the U-shaped portion 21a. As illustrated in FIGS. 2 and 3, the U-shaped portion 21a is in engagement with a pivot 20d provided in the receiving portion 20a of the eject bar 20. By a simple operation of only dropping the locking member 21 on the receiving portion 20a of the eject bar 20, it is possible to mount the locking member 21 so that the U-shaped portion 21a is properly supported by the pivot 20d. Therefore, there is no need for a dedicated jig for press-fitting the locking member 21 to the eject bar 20.

In the state where the U-shaped portion 21a of the locking member 21 is supported by the pivot 20d, the locking portion 21b and the spring portion 21c are swingable in a direction parallel to the base portion 13a and crossing the fitting or ejection direction A1 or A2.

When the card 41 is in the fitted state, the spring portion 21c abuts against an abutting portion 15f of the cover 15 so that the locking portion 21b is urged toward the card 41. The locking portion 21b is a portion extending from the U-shaped portion 21a and having elasticity.

Figure 6:
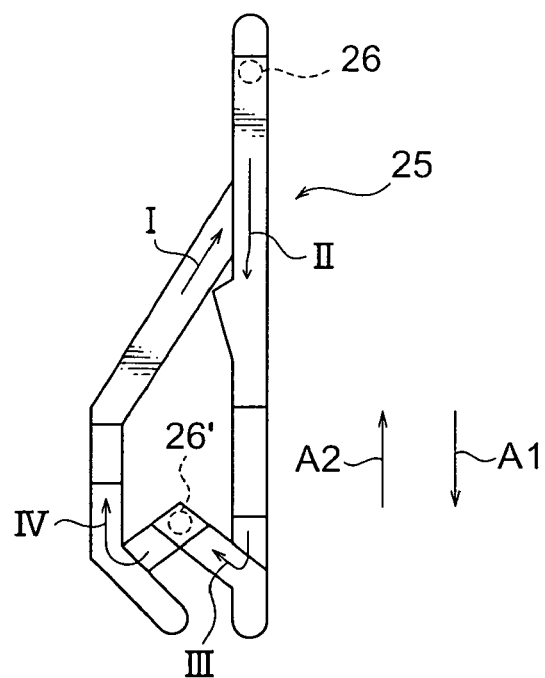
FIG. 6 is an explanatory diagram for explaining the operation of a generally heart-shaped cam portion included in the card connector of FIG. 1.

Referring to FIG. 6, the relationship between the cam portion 25 and the cam follower 26 will be described.

As described before, the one end portion of the cam follower 26 is inserted in the cam portion 25. Therefore, if the eject bar 20 is caused to reciprocatingly slide in the fitting and ejection directions A1 and A2, the one end portion of the cam follower 26 moves as indicated by arrows in FIG. 6, so that the locking member 21 swings about the pivot 20d as a fulcrum according to the generally heart shape of the cam portion 25.

Figure 7:
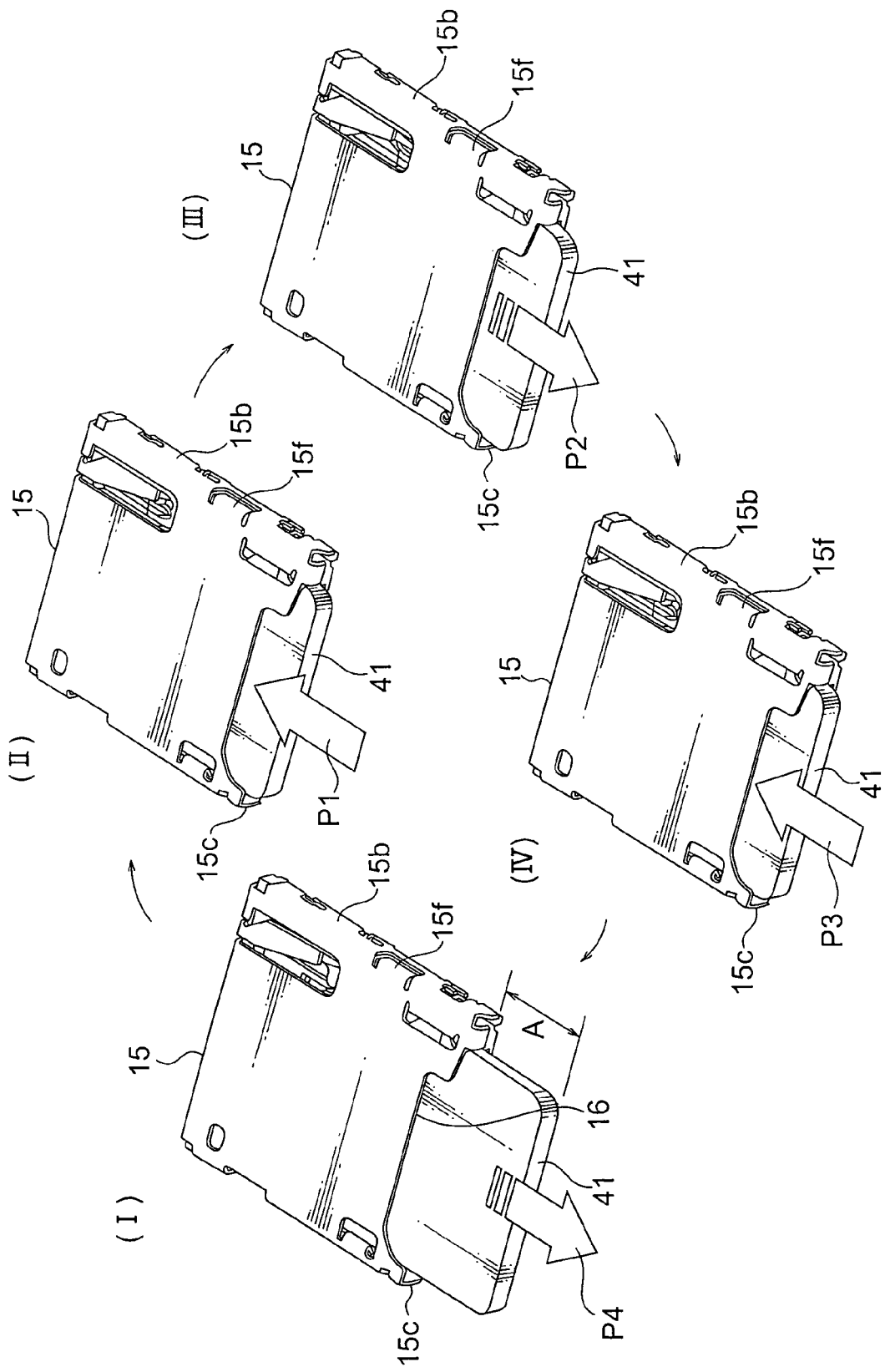
FIG. 7 is an explanatory diagram for explaining the operations of fitting and ejecting the card with respect to the card connector of FIG. 1.

Referring to FIG. 7 in addition to FIG. 6, the operation of the card connector of FIG. 1 will be described.

FIG. 7, (I) illustrates, like FIG. 1, an ejected state where the card 41 is ejected to a position where the card 41 can be pulled out of the connector. FIG. 7, (II) illustrates a butted state where, on the way of insertion of the card 41 into the card receiving region, the card 41 is pushed and butted in the fitting direction A1. FIG. 7, (III) illustrates a fitted state where the card 41 is fitted into the connector. FIG. 7, (IV) illustrates a butted state where the card 41 is pushed and butted in the fitting direction A1 from the fitted state illustrated in FIG. 7, (III).

When inserting the card 41 into the card receiving region from the ejected state illustrated in FIG. 7, (I), the card 41 is pushed in the fitting direction A1 as indicated by arrow P1 illustrated in FIG. 7, (II). In this event, the eject bar 20 is pushed by the card 41 to slide in the fitting direction A1 while energizing the spring 23. By further pushing the eject bar 20 in the fitting direction A1, the position of the one end portion of the cam follower 26 changes in a direction of arrow II (see FIG. 6) in the cam portion 25.

When the card 41 is pushed to a predetermined position in the connector, the card 41 slightly moves back in the ejection direction A2 (see arrow P2) due to a reaction force of the spring 23 as illustrated in FIG. 7, (III) (see also arrow IIII in FIG. 6). Then, even if the pushing force to the card 41 is released, the eject bar 20 is locked to the pushed state due to the operation of the cam portion 25. In this event, the connection conductors of the card 41 and the contact portions 11*d* of the contacts 11 are electrically connected together.

When the card 41 is further pushed slightly (see arrow P3) from the fitted state illustrated in FIG. 7, (III), the locking of the eject bar 20 is released due to the operation of the cam portion 25. In this event, the one end portion of the cam follower 26 moves to a position in a direction of arrow IV (see FIG. 6) in the cam portion 25.

Therefore, the eject bar 20 moves in the ejection direction A2 due to the urging force of the spring 23. In this event, as illustrated in FIG. 7, (I), the eject bar 20 provides the ejected state where the card 41 is separated from the contacts 11 and pushed out of the card receiving region. In this state, the one end portion of the cam follower 26 changes its position in a direction of arrow I (see FIG. 6) to return to the ejection position in the cam portion 25.

In the ejected state illustrated in FIG. 7, (I), the card 41 most protrudes from the opening 16 of the connector by the dimension A in the ejection direction A2. In the fitted state illustrated in FIG. 7, (III), the card 41 protrudes from the opening 16 by a dimension slightly shorter than the dimension A. In the butted states illustrated in FIG. 7, (II) and (IV), the card 41 protrudes from the opening 16 by a dimension slightly smaller than that in the fitted state.

In this manner, the eject bar 20 serves as the push-push type eject mechanism by the operation of the cam portion 25. Since the structures and operations of this type of eject mechanisms are described in detail in the foregoing publication ((JP-A) No. 2003-217738), Japanese Unexamined Patent Application Publication (JP-A) No. 2001-326028, and Japanese Unexamined Patent Application Publication (JP-A) No. 2000-260524, a further description thereof is omitted herein.

When the card 41 is in the ejected state illustrated in FIG. 7, (I), the card 41 can be pulled out in a direction of arrow P4 so as to be removed from the connector.

Referring also to FIGS. 8 to 13, the description will be continued.

Figure 8:
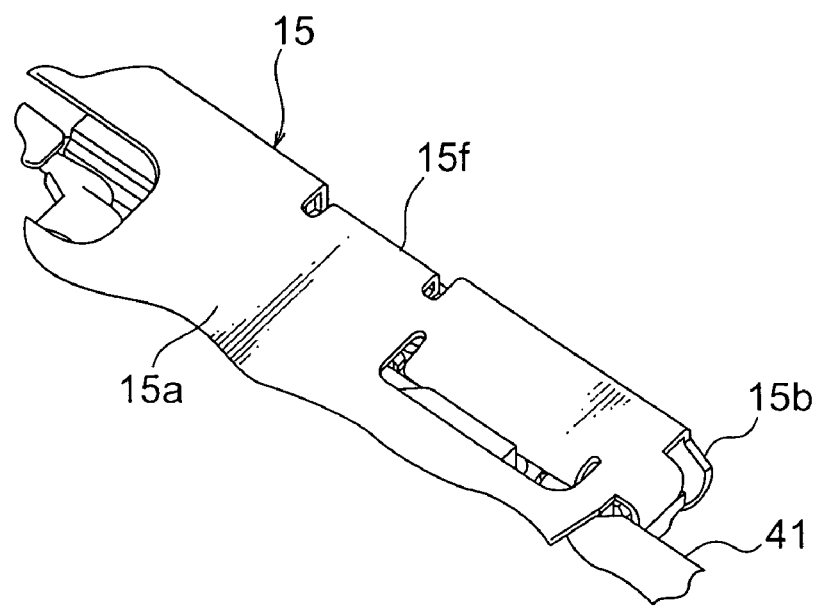
FIG. 8 is a perspective view illustrating only part of FIG. 1.
Figure 9:
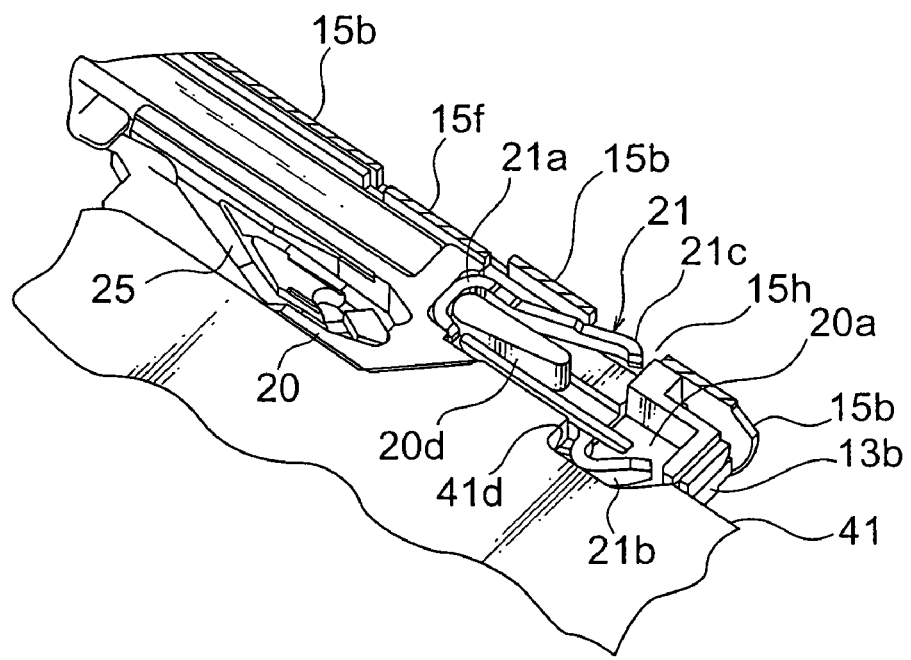
FIG. 9 is a perspective view illustrating an internal mechanism by cutting off the cover of the card connector from the state of FIG. 8.

FIGS. 8 and 9 each illustrate the ejected state illustrated in FIG. 7, (I). Referring to FIG. 7, (I) and also to FIGS. 8 and 9, the side plate portion 15*b* of the cover 15 is provided with the abutting portion (also called a preload spring receiving portion) 15*f* adapted to abut against the spring portion 21*c* of the locking member 21.

One side surface, extending in the fitting or ejection direction A1 or A2, of the card 41 is formed with a recess 41*d* adapted to engage with the locking portion 21*b* in the ejected state. The recess 41*d* has a recessed shape that allows a curved end portion of the locking portion 21*b* to enter.

In the ejected state where the card 41 is ejected, the spring portion 21*c* of the locking member 21 is not in abutment with the abutting portion 15*f* of the cover 15, but is located in an open portion 15*h* in the form of a cutout formed in the side plate portion 15*b* of the cover 15 and thus is in a free state.

In the state where the card 41 is not inserted in the connector, the eject bar 20 has moved to a predetermined position in the ejection direction A2. When the card 41 is inserted, the eject bar 20 is pushed by the card 41 to move in the fitting direction A1. In this event, the cam portion 25 and the cam follower 26 cooperate to swing the locking member 21 in one direction. When the card 41 is further inserted from the state of FIG. 9, the card 41 is connected to the contacts 11. In the ejected state of FIG. 9, since the recess 41*d* of the card 41 is in engagement with the locking portion 21*b* of the locking member 21, the card 41 does not easily come off the connector, thereby preventing removal of the card 41 from the connector.

Figure 10:
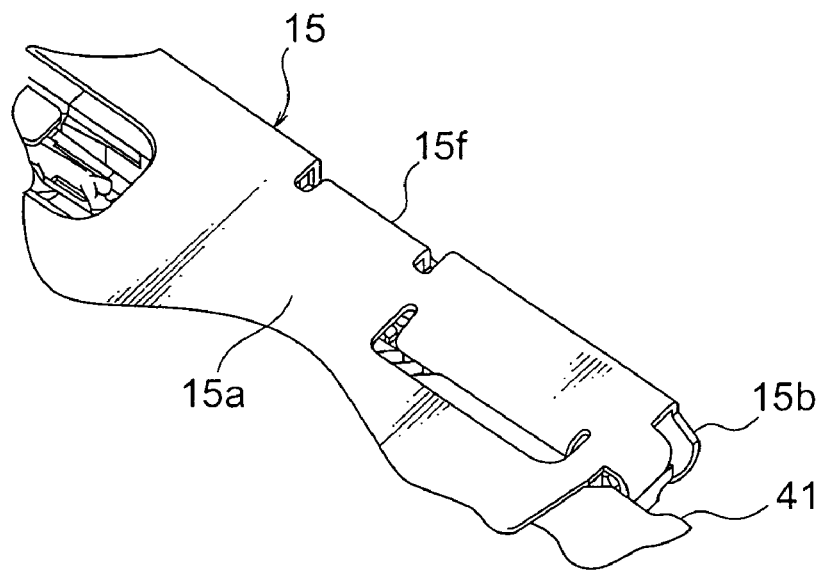
FIG. 10 is a perspective view, similar to FIG. 8, illustrating the card connector of FIG. 1 along with the card in a fitted state.
Figure 11:
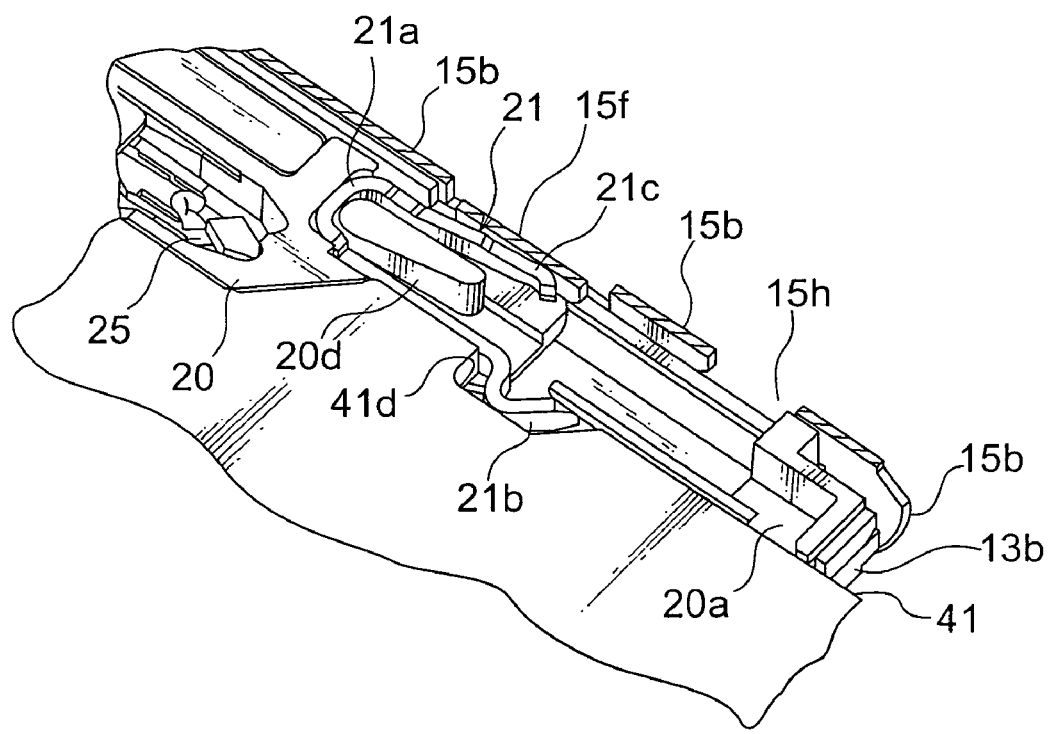
FIG. 11 is a perspective view, similar to FIG. 9, in the state of FIG. 10.

Further, in the fitted state where the card 41 is fitted into the connector, as illustrated in FIG. 7, (III) and FIGS. 10 and 11, the spring portion 21*c* of the locking member 21 is in abutment with the abutting portion 15*f* of the cover 15 so that the locking portion 21*b* is urged toward the card 41. That is, the locking member 21 placed in the receiving portion 20*a* of the eject bar 20 changes the load applied to the card 41 in the ejected state and the fitted state, using a difference in preload caused by the abutting portion 15*f*.

Figure 12:
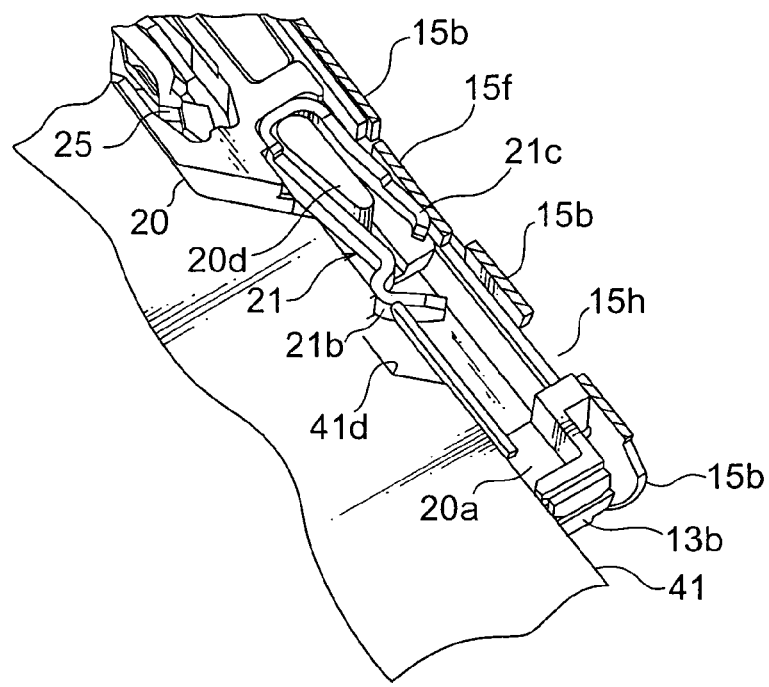
FIG. 12 is a perspective view, similar to FIG. 9, when the card is forcibly pulled out in the state of FIG. 11.

FIG. 12 illustrates a state where the card 41 is pulled out in the ejection direction A2 from the fitted state of the card 41 and the connector illustrated in FIG. 7, (III) and FIGS. 10 and 11. If, in this manner, the card 41 is forcibly pulled out in the fitted state, since the spring portion 21*c* of the locking member 21 is in abutment with the abutting portion 15*f* and thus is displaced to urge the locking portion 21*b* toward the card 41, when the curved end portion of the locking portion 21*b* disengages from the recess 41*d* as illustrated in FIG. 12, the pushing force of the locking portion 21*b* increases so that it becomes difficult to pull out the card 41.

Figure 13:
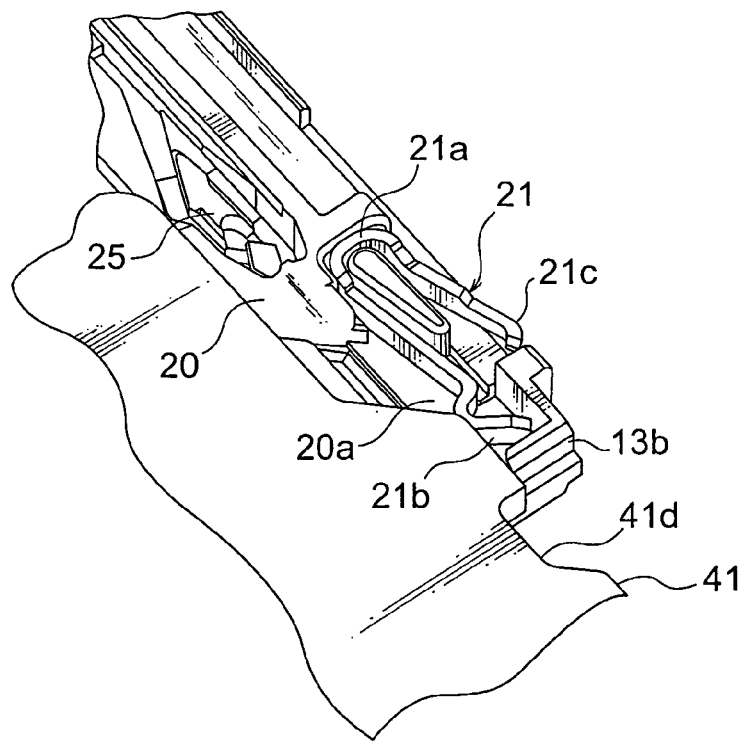
FIG. 13 is a perspective view, similar to FIG. 9, when the card is pulled out in the state of FIG. 9, i.e. on the way of removal from the card connector.

FIG. 13 illustrates a state where the card 41 is pulled out in the ejected state illustrated in FIG. 7, (I) and FIGS. 8 and 9, i.e. on the way of removal from the connector. In FIG. 13, the cover 15 is omitted.

The spring portion 21*c* of the locking member 21 is out of engagement with the abutting portion 15*f* and thus is not preloaded. In such a non-preloaded state, it is possible to move the locking portion 21*b* outside the recess 41*d* of the card 41 and thus to pull out the card 41.

Figure 14:
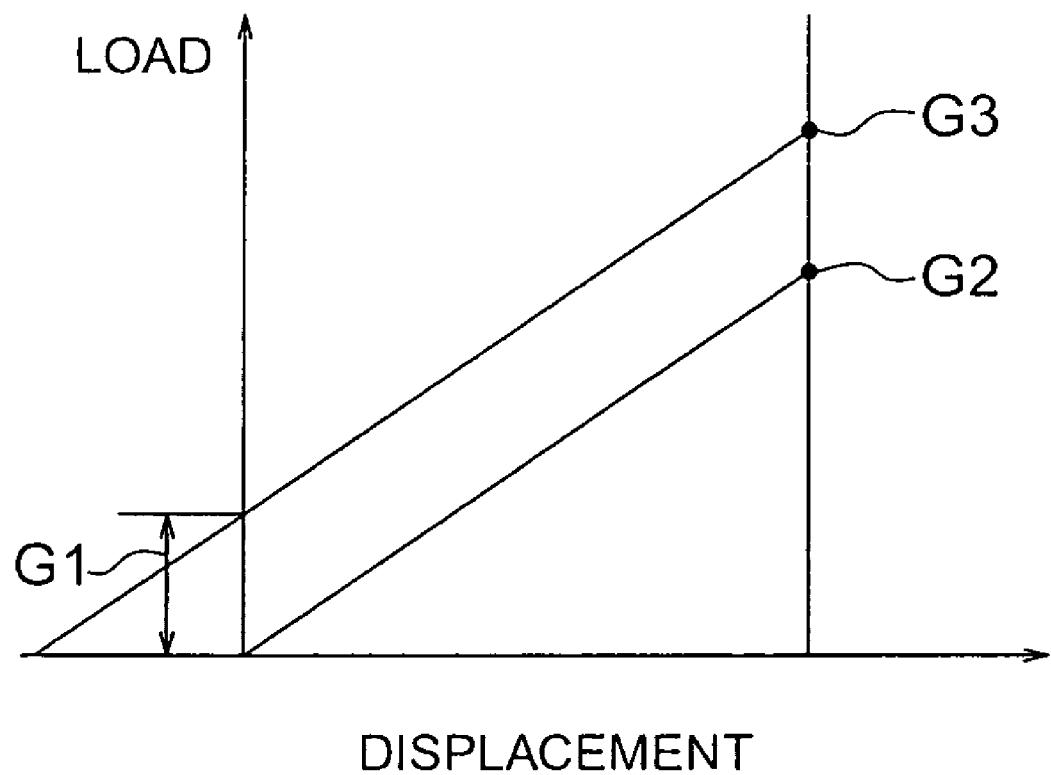
FIG. 14 is a graph showing the relationship between the load applied to the card and the displacement of the locking member in the card connector of FIG. 1.

Referring to FIG. 14, the relationship between the load applied to the card 41 and the displacement of the locking member 21 will be described.

As shown in FIG. 14, the locking member 21 is displaced due to the abutment with the abutting portion 15*f* and has a load G1 in a displaced preloaded state. Because of the load G1, a load G2 applied to the card 41 from the locking portion 21*b* of the locking member 21 in the ejected state becomes lower than a load G3 applied to the card 41 therefrom in the fitted state.

There is a connector having no cover 15. In such a connector, the side frame portion 13*b* of the housing 13 may be formed with an abutting portion instead of the abutting portion 15*f* of the cover 15. Further, the locking portion 21*b* of the locking member 21 does not necessarily have elasticity.

The card connector described above is applicable for connection to a card such as an IC card or a communication card.

Various exemplary embodiments of this invention will be enumerated in the following items 1-10.

1. A card connector for connection to a card 41, comprising:
    a connector frame 13 and 15 which defines a region allowing the card to be fitted therein;

a contact 11 which is held by the connector frame and adapted for contact with the card;

an eject member 20 which is movable with respect to the connector frame for ejecting the card; and a locking member 21 which is swingably held by the eject member and having a locking function to lock the card, wherein the locking member swings due to engagement with the connector frame according to movement of the eject member, thereby controlling the locking function.

2. The card connector according to item 1, wherein the connector frame comprises:

a housing 13 for receiving the card; and a cover 15 which is coupled to the housing and covering the contact, and wherein the contact is held by the housing.

3. The card connector according to item 1, wherein the eject member is movable in a fitting direction A1 of the card with respect to the connector frame and in an ejection direction A2 opposite to the fitting direction.

4. The card connector according to item 3, wherein the locking member is disposed at an end, in the ejection direction, of the eject member.

5. The card connector according to item 1, wherein the locking member comprises:

a locking portion 21b for engagement with the card;

a spring portion 21c engages with the connector frame; and a holding portion 21a between the locking portion and the spring portion, and wherein the holding portion is swingably held by the eject member.

6. The card connector according to item 5, wherein the eject member includes a receiving portion having a pivot and the holding portion is placed in the receiving portion so as to extend around the pivot.

7. The card connector according to item 6, wherein the holding portion comprises a U-shaped portion 21a having a generally U-shape, the locking portion is connected to one end of the U-shaped portion, and the spring portion is connected to the other end of the U-shaped portion.

8. The card connector according to item 5, wherein at least one of the locking portion and the spring portion has elasticity.

9. The card connector according to item 5, wherein the connector frame has an abutting portion 15f for abutting against the spring portion and an open portion 15h for receiving the spring portion, and the abutting portion and the open portion are placed at positions different from each other in a direction of the movement of the eject member, respectively, and control the locking function of the locking member according to the movement of the eject member.

10. The card connector according to item 1, wherein the locking member has a generally U-shape.

While the invention has been particularly shown and described with reference to the exemplary embodiment thereof, the invention is not limited to these embodiments. It will be understood by those of ordinary skill in the art that various changes in form and details may be made therein without departing from the spirit and scope of the present invention as defined by the claims.

What is claimed is:

1. A card connector for connection to a card having a recess, the card connector comprising:

a connector frame having first side walls and a rear wall which defines a region allowing the card to be fitted therein;

a conductive cover having second side walls for covering the first side walls;

a contact which is held by the connector frame and adapted for contact with the card;

an eject member which is movable with respect to one of the first sidewalls of the connector frame for ejecting the card; and a locking member for locking the card in the connector frame, said locking member being swingably held by the eject member, wherein the locking member swings due to engagement with the connector frame according to movement of the eject member to permit locking and unlocking of the card in the connector frame, wherein the locking member comprises:

a locking portion for engagement with the card;

a spring portion; and a holding portion which is connected between the locking portion and the spring portion and engaged with the eject member, wherein the conductive cover comprises an abutting portion for abutting against the spring portion and an open portion for receiving the spring portion therein, wherein the abutting portion and the open portion are positioned along the one of the first side walls and spaced apart from each other in a direction of the movement of the eject member, respectively, and cause the locking member to lock or unlock the card from the connector frame according to the movement of the eject member;

wherein, in an ejected state where the card is ejected, the spring portion is located in the open portion of the connector frame while the locking portion is engaged with the recess of the card, and wherein, with the locking portion being engaged with the recess, the locking member is movable together with the card between a position where the card is ejected and another position where the card is fitted into the fitting region.

2. The card connector according to claim 1, wherein the connector frame comprises:

a housing for receiving the card; and a cover which is coupled to the housing and covering the contact, and wherein the contact is held by the housing.

3. The card connector according to claim 1, wherein the eject member is movable in a fitting direction of the card with respect to the connector frame and in an ejection direction opposite to the fitting direction.

4. The card connector according to claim 3, wherein the locking member is disposed at an end, in the ejection direction, of the eject member.

5. The card connector according to claim 1, wherein the eject member includes a receiving portion having a pivot and the holding portion is placed in the receiving portion so as to extend around the pivot.

6. The card connector according to claim 5, wherein the holding portion comprises a U-shaped portion having a generally U-shape, the locking portion is connected to one end of the U-shaped portion, and the spring portion is connected to the other end of the U-shaped portion.

7. The card connector according to claim 1, wherein at least one of the locking portion and the spring portion has elasticity.

8. The card connector according to claim 1, wherein the locking member has a generally U-shape.

* * * * *

UNITED STATES PATENT AND TRADEMARK OFFICE
CERTIFICATE OF CORRECTION

PATENT NO.        : 7,708,575 B2                                        Page 1 of 1
APPLICATION NO.   : 12/313843
DATED             : May 4, 2010
INVENTOR(S)       : Motojima It is certified that error appears in the above-identified patent and that said Letters Patent is hereby corrected as shown below:

In particular, in Column 8, line 4 (Line 11 of Claim 1), after the word "first", please change "sidewalls" to correctly read: --side walls--.

Signed and Sealed this

Sixth Day of July, 2010

David J. Kappos
*Director of the United States Patent and Trademark Office*